3,188,377
ARMATURE BAR TRANSPOSITION
William C. Hughes, Scotia, N.Y., assignor to General
Electric Company, a corporation of New York
Filed June 8, 1962, Ser. No. 201,170
5 Claims. (Cl. 174—33)

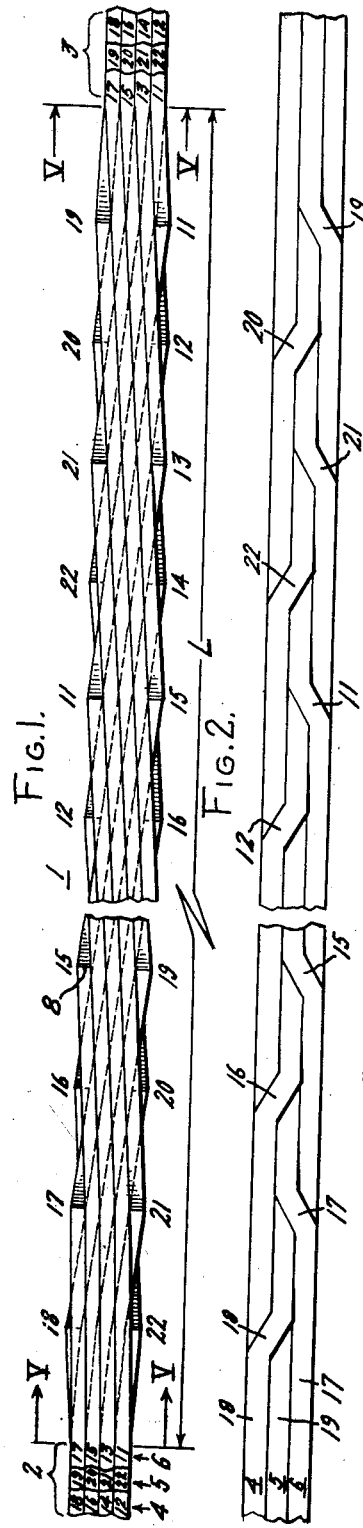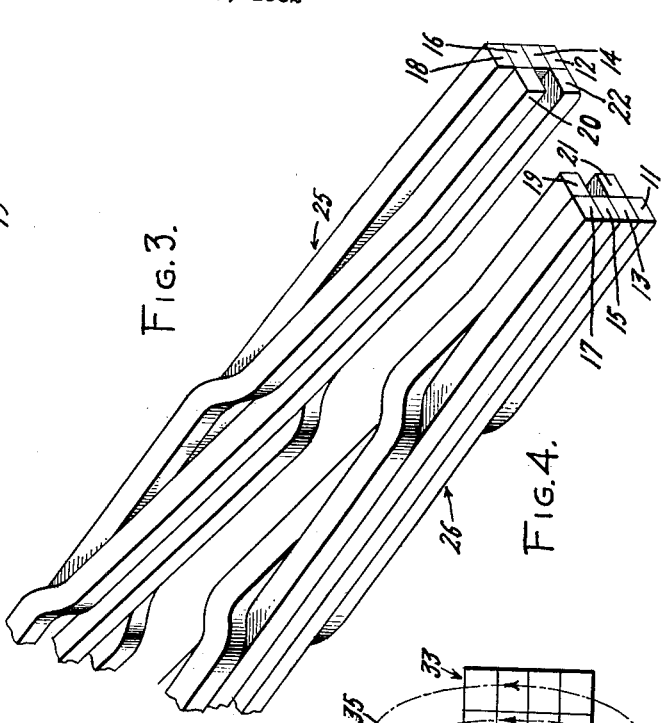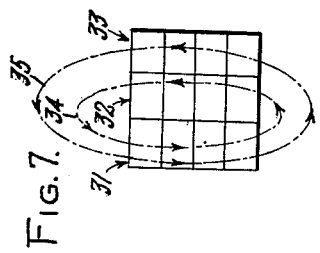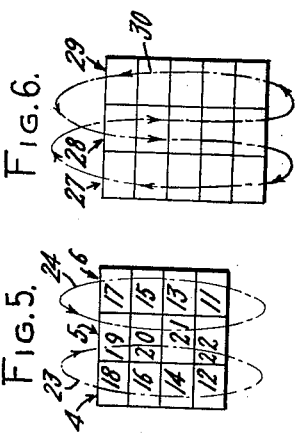
Inventor:
William C. Hughes
by W. C. Crutcher
His Attorney

# United States Patent Office 3,188,377
Patented June 8, 1965

This invention relates to a strand transposition arrangement for a multi-strand generator armature bar.

Most large A.-C. generators have stationary armature windings comprising insulated multi-strand bars disposed in longitudinal slots formed in a laminated stator core. The armature bars have straight slot portions and curved end-turn portions, the latter being connected at their ends to similar armature bar end turns to provide a winding. The strands are insulated from one another over the length of the slot and along the end-turn portions, but since they are connected electrically at their ends, alternating magnetic fluxes passing through the armature bar can cause circulating currents to flow between strands, which are of no useful value and which produce additional losses in the form of heat.

The principal flux field of concern is a strong "cross-slot" flux which increases in intensity approximately linearly with distance from the bottom of the slot. This "cross-slot" flux causes an E.M.F. to be generated in the strands near the top of the slot which is greater than the E.M.F. generated in the strands near the bottom of the slot. Hence, it ha sbeen known to vary the position of the strands in the slot by "transposing" the strands (varying their relative positions in the bar along the length of the slot), so that the total E.M.F. induced in every strand over the length of the slot is approximately equal. In a bar having two adjacent radial stacks of strands, this is accomplished rather easily by repetitively bending the top strands of one stack into the adjacent stack, so that the strands "rotate" positions, i.e., occupy successive positions in the stack in succeeding locations along the bar. A commonly known arrangement is the "Roebel transposition," in which the strands rotate positions through 360 degrees, i.e., occupy every strand position along the slot, as may be seen by reference to U.S. Patent 1,144,252, issued June 22, 1915. Such an arrangement will exactly balance the induced voltages of each strand due to cross-slot flux.

The foregoing transposition and other similar arrangements are generally applicable to two-strand-wide armature bars, each comprised of two adjacent stacks of strands in a common slot, although bars having four stacks of strands can be constructed by separately transposing two "half bars" of two stacks each, and placing them side-by-side in the slot. Occasionally, however, for a particular rating, there arises a need for a bar which is three strands wide. This is because the size and shape of the slot may be determined by other considerations of generator design, and when it is attempted to determine the strand arrangement, it is found that a four-strand-wide bar gives strands which are too small for easy manufacture. At the same time, it may be found that a two-strand-wide bar gives strands which are too wide in relation to their depth.

Accordingly, one object of the invention is to provide an improved transposition arrangement for a three-strand-wide armature bar.

Another object of the present invention is to provide a three-strand-wide armature bar which cancels the unequal voltage components due to cross-slot flux.

Briefly stated, the invention is practiced by transposing the strands in a three-strand-wide bar by rotation from two of the stacks through a third "common" stack of strands. The transposition is carried out so that any given strand portion will match a corresponding portion of any other strand at the same vertical position along the slot portion of the bar.

The subject matter which is regarded as the invention may be particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic elevation view of the straight transposed portion of a 3-strand-wide armature bar, with the heavy insulating sheath omitted for clarity;

FIG. 2 is a top view of the armature bar of FIG. 1;

FIGS. 3 and 4 are perspective views of portions of the right and left halves of the transposed armature bar of FIGS. 1 and 2, illustrating how they nest;

FIG. 5 is a schematic cross-sectional view of the bar, taken along either of the lines V—V of FIG. 1;

FIGS. 6 and 7 are similar schematic cross-sectional views of modifications of the invention;

FIG. 8 is a top view of a portion of the armature bar corresponding to FIG. 7 of the drawings; and FIG. 9 is a simplified diagrammatic view of a strand transposition illustrating that strand voltages are equal.

Referring to FIG. 1 of the drawing, there is seen a schematic elevation view of a 3-strand-wide armature bar, omitting the usual insulating sheath of ground insulation. The bar comprises a straight twisted-strand portion, shown generally as 1, which is adapted to lie in the slot of a dynamoelectric machine and at either end thereof are untwisted strand portions indicated by brackets 2, 3 showing a small portion of the end turns of the armature bar which are usually formed on a curve of complex curvature.

The bar is made up of three radially-disposed stacks or columns of individually-insulated strands, the stacks being designated generally as 4, 5 and 6. Although the number of strands in each stack will generally be much greater than that shown, the number has been reduced to four in order to facilitate description. The strands in the nearest stack 6 are shown by solid lines. The strands in the middle stack 5 appear, for the most part, as dashed lines. To increase the clarity of the drawing, the strands in the far stack 4 are shown only where they appear at the top and bottom of the bar, and are not shown by dashed lines where they pass through the bar.

The strands in the far stack 4 are designated by even numbers 12, 14, 16, 18; those in the nearest stack 6 are designated by odd numbers 11, 13, 15, 17; and strands in the center stack 5 are designated by numerals 19, 20, 21, 22.

The strand "cross-overs," one of which is seen at 8, represent transverse bends in the strand, so that it can cross from one stack into another stack. These cross-overs are labeled on the top and bottom of the bar with the number of the strand which is being bent. The axial distance between cross-overs is the "pitch" indicative of the rate of transposition per axial increment of bar length. In FIG. 1, the pitch is uniform along the twisted strand section 1 of the bar.

In accordance with the invention, one of the stacks of strands is selected as a "common" stack and the strands from the other two stacks are alternately transposed by bending into the common stack. In the preferred embodiment shown in FIG. 1, the center stack 5 is chosen as the common stack, and the top strands of stacks 4, 6 are alternately bent transversely into the common stack 5 at each of the cross-overs 8 along the entire twisted strand portion 1 of the bar, moving from left to right.

FIG. 2 shows a top view of the same bar as in FIG. 1, again with the insulating sheath removed. Going from left to right, it will be seen that first, the strand 18 in stack 4 is bent into the center stack 5, after which the strand 17 in stack 6 is bent into the center stack 5, etc.

Reference to the cross-sectional view of FIG. 5 will illustrate the pattern of transposition more clearly. There stacks 4, 5, 6 are shown in cross-section, with the center stack 5 being the common stack. The strands are numbered in accordance with the strand numbering in FIGS. 1 and 2. Rotation of the relative strand positions takes place along the closed paths indicated at 23, 24 in the direction indicated by the arrows, although it could take place equally well if both arrows were reversed. Movement of individual strands following along paths 23, 24 into the center stack 5 takes place alternately. For example, in FIG. 3, the first cross-over is made when strand 18 follows path 23 and is bent transversely over to stack 5 to lie on top of strand 19. At the same time, to make room in stack 5 for the extra strand, the bottom strand 22 is bent transversely so as to lie beneath strand 12. Next, strand 17 in stack 6 is bent transversely to lie on top of strand 18, in its new position, while strand 21 is bent transversely to lie beneath strand 11.

The foregoing description of FIG. 3 might indicate that the top strands of the three stacks 4, 5, 6 were always aligned with one another vertically. In actuality, the heights of the stacks, relative to one another, continually change in moving along the bar, as will be apparent from FIG. 1. Any imperfections in radial (or vertical) height are filled with insulating filler material. Later, when the heavy insulating sheath (not shown) is compacted about the strands, variations in vertical height of the stacks over the bar will be reduced and the cross-section will appear substantially as shown in FIG. 5.

As indicated previously, the two outside stacks 4, 6 must be constantly "moving" upward when passing from left to right along the bar, by virtue of the slope of the strands, while the center stack 5 is "moving" downward. Since the center stack 5 must accept strands from two stacks, it follows that the relative downward vertical "movement" of the strands in stack 7 for a given increment of axial length must be twice as great as the upward "movement" of strands in stacks 4, 6.

In other words, as transposition continues, the strands in stack 5 move downward at twice the vertical rate as the strands in stacks 4, 6 move upward. This means that the strand "slope" (or vertical movement per increment of longitudinal movement) is twice as great for a strand in the center stack 5 as it is for a strand in the side stacks 4, 6.

The pitch between cross-overs of the bar illustrated in FIGS. 1 and 2 is selected, with regard to the length of the twisted strand portion 1 and the number of strands in each stack. For example, in FIG. 1, where the cross-overs are equally spaced, the pitch will be equal to $$\frac{L}{3n+1}$$

where L is the length of the twisted strand portion between points where the strands first start to "move" and $n$ is the number of strands in a single stack. The aforementioned pitch between strand cross-overs will return a strand to its original position.

It should be noted at this point that, in order for the strands to follow paths 23, 24 in FIG. 5, so that they travel through only two of the three stacks, there must be an even number of strands in each stack. In other words, as seen in the drawing, where there are four strands in each stack, the strands designated by even numbers will always pass through stacks 4 and 5, while the strands designated by odd numbers will always pass through stacks 5 and 6.

As a consequence of using an even number of strands in each stack, and the center stack as the common stack, reference to FIGS. 3 and 4 of the drawing illustrates that the bar may be separated into two halves, a right half 25 and a left half 26. Each half 25, 26 will contain all of the strands in one of the side stacks and half of the strands in the center stack.

The strands in FIGS. 3, 4 are numbered according to the plan of FIG. 1. It will be apparent that the right-hand half 25 contains all even-numbered strands while the left-hand half 26 contains only odd-numbered strands. By observing the relative positions of the spaced strands 19, 21, 22, 20 in the center stack portions, it will be observed that these strands will nest so that halves 25, 26 may be separately manufactured, if desired, and later placed together to form a three-strand-wide bar. For example, it will be seen that strand 21 is in the correct relative position and at the correct slope for it to nest between strands 20, 22.

It is not actually necessary to select the center stack as the common stack, as may be seen by reference to FIGS. 6 and 7, showing alternate arrangements. FIG. 6 is a schematic cross-section of a bar having stacks 27, 28, 29, each of which contains an odd number of strands. The path which will be followed by the strands, when transposed according to the foregoing procedure, is that indicated by the closed "figure 8" loop 30. It will be observed that each of the strands will pass through all three stacks if the transposition is continued. FIG. 6 balances the bar against radial flux distribution, as well as cross slot flux distribution.

FIG. 7 is a cross-section of a bar having stacks 31, 32, 33 in which an outside stack 31 is selected as the "common" stack. The strands from stacks 32, 33 are alternately bent transversely into the common stack 31, the strands following the numbered paths 34, 35 in the direction indicated by the arrows.

FIG. 8 is a plan view of a portion of the bar whose cross-section is indicated in FIG. 7 and the plan view makes it apparent how the top strands are alternately bent from the center stack and one of the side stacks into the opposite side stack.

Although the preceding modifications using an odd number of strands or choosing a stack other than the central stack as the common stack have been illustrated, it will generally be found that the simplest construction results from the preferred embodiment shown in FIGS. 1 through 5.

The advantages and operation of the transportation arrangement disclosed will be apparent from the following description. As mentioned previously, "cross-slot" flux will induce voltages of different magnitudes at difference radial (or vertical) heights within the bar. If any selected portion of one strand can be shown to have a matching portion of any other strand at the same radial height in the bar, then the total induced voltage in each individual strand will be the same as that in any other strand, and the circulating currents between strands due to cross-slot flux will be avoided.

Reference to FIG. 9 will indicate graphically that the aforementioned criterion is met. FIG. 9 is a single-line diagram in which two typical strands, 34 near the vertical center of the bar and 35 near the bottom of the bar, are diagrammatically shown as single lines. The solid line portion indicates travel in the outside stack, while the dotted line portion indicates travel in the center common stack. It will be observed that the slope of the solid line portion is half as great as that of the dotted line portion, as mentioned previously. Any strand portion must assume comparable radial positions along the bar as every other strand, in order for total voltages in each strand to be the same. In FIG. 8, it will be seen that portion 34a of strand 34 corresponds to portion 35a of strand 35. Portion 34b corresponds to portion 35b; and portion 34c corresponds to portion 35c. This simple proof can be extended to strands at any location.

Thus it can be seen that the disclosed arrangement provides an improved armature bar transposition for bars employing three radial stacks of strands per slot. The arrangement cancels the unequal components of induced voltages due to cross-slot flux, as seen by the graphical proof of FIG. 9.

Other modifications of the invention will occur to those skilled in the art, and, while there has been described what is at present considered to be the preferred embodiment of the invention, it is of course intended to cover in the appended claims all such modifications as fall within the true spirit and scope of the invention.

What is claimed as new and desired to be secured by Letters Patent of the United States is:

1. A transposed conductor bar for a dynamoelectric machine having a core member with longitudinal slots for receiving the conductor bars, comprising:

first, second and third adjacent stacks of insulated conductor strands disposed to form a bar three strands wide and one stack high, said bar having a transposed portion adapted to occupy the slot portion of the core member, wherein the topmost strands of said first and second stacks are alternately bent transversely into said third stack; while the bottommost strands of the third stack are correspondingly bent transversely into the first and second stacks alternately.

2. A transposed conductor bar comprising:

first, second and third stacks of insulated conductor strands arranged beside one another to form a bar three strands wide and one stack high, said bar having a straight transposed portion wherein the top strands of said first and second stacks are alternately bent transversely into said third stack, while the bottom strands of the third stack are alternately bent transversely into the first and second stacks, whereby the individual strand slope in the third stack is substantially twice that of the strand slope in the first and second stacks at a corresponding location, said transposed portion being of such a length that a selected portion of a given strand is at the same height in the bar as a corresponding selected portion of any other strand.

3. A transposed conductor bar comprising:

first, second and third stacks of insulated conductor strands, said stacks each having an equal even number of strands and being arranged beside one another to form a bar three strands wide and one stack high, said bar having a straight transposed portion wherein the top strands of said first and second stacks are alternately bent transversely into said third stack while bottom strands in the third stack are alternately bent transversely into the first and second stacks, whereby the individual strand slope in the third stack is substantially twice that of the strand slope in the first and second stacks at a corresponding location, the transposed portion of the bar being of such a length that a selected portion of a given strand is at the same height in the bar as a corresponding selected portion of any other strand, whereby cross-slot induced voltage variations between individual strands are cancelled.

4. A transposed conductor bar comprising:

three stacks of insulated conductor strands, each stack having an equal even number of strands and arranged beside one another to form a bar three strands wide and one stack high, said bar having a straight transposed portion wherein the top strands of the two outer stacks are alternately bent transversely into the center stack to form top crossovers, while bottom strands of the center stack are alternately bent transversely into the outer stack, whereby the individual strand slope in the center stack is substantially twice that of the strand slope in the outer stacks at the corresponding location, the length of the transposed portion of said bar being such that a selected portion of a given strand is at the same height in the bar as a corresponding selected portion of any other strand.

5. The armature bar of claim 4 wherein the pitch between said top cross-overs is uniform and is substantially equal to $$\frac{L}{3n+1}$$

where $L$ is the length of the straight transposed portion and $n$ is the number of strands in each stack.

References Cited by the Examiner
UNITED STATES PATENTS

| | | | |
|---|---|---|---|
| 1,144,252 | 6/15 | Roebel | 310—213 |
| 2,249,509 | 7/41 | Welch et al. | 310—213 |
| 2,830,208 | 4/58 | Staats | 310—213 |
| 2,896,102 | 7/59 | Bucklew | 310—213 |

MILTON O. HIRSHFIELD, *Primary Examiner.*

ORIS L. RADER, *Examiner.*